US012453874B2

(12) United States Patent
Akguen et al.

(10) Patent No.: US 12,453,874 B2
(45) Date of Patent: Oct. 28, 2025

(54) FALL ARREST DEVICE

(71) Applicant: TRACTEL GREIFZUG GMBH, Bergisch Gladbach (DE)

(72) Inventors: Thorsten Akguen, Bergisch Gladbach (DE); Andreas Jebing, Kuerten (DE); Thomas Rottlaender, Overath (DE); Klaus-Dieter Ott, Kuerten (DE); Alexander Steinhauer, Neunkirchen-Seelscheid (DE)

(73) Assignee: TRACTEL GREIFZUG GMBH, Bergisch Gladbach (DE)

( * ) Notice: Subject to any disclaimer, the term of this patent is extended or adjusted under 35 U.S.C. 154(b) by 453 days.

(21) Appl. No.: 18/152,603

(22) Filed: Jan. 10, 2023

(65) Prior Publication Data

US 2023/0233882 A1 Jul. 27, 2023

Related U.S. Application Data

(63) Continuation of application No. PCT/EP2021/066286, filed on Jun. 16, 2021.

(30) Foreign Application Priority Data

Jul. 13, 2020 (EP) .................................... 20185432

(51) Int. Cl.
*A62B 1/10* (2006.01)
*A62B 35/00* (2006.01)

(52) U.S. Cl.
CPC ............ *A62B 35/0093* (2013.01); *A62B 1/10* (2013.01)

(58) Field of Classification Search
CPC ........................ A62B 1/08–14; A62B 35/0093
See application file for complete search history.

(56) References Cited

U.S. PATENT DOCUMENTS 4,555,091 A * 11/1985 May ..................... B66D 1/7415 188/65.1
2004/0020727 A1 2/2004 Petzl et al.
(Continued)

FOREIGN PATENT DOCUMENTS

CN 101678999 A1 3/2010
CN 110402230 A1 11/2019
(Continued)

OTHER PUBLICATIONS

International Search Report and Written Opinion dated Aug. 23, 2021 from counterpart International Patent Application No. PCT/EP2021/066286.
(Continued)

*Primary Examiner* — David R Morris
(74) *Attorney, Agent, or Firm* — SHUTTLEWORTH & INGERSOLL, PLC; Jason R. Sytsma

(57) ABSTRACT

A fall arrest device for blocking a rope when a relative speed between the rope and the device reaches a threshold value comprises a blocking mechanism for blocking the rope, and a trigger mechanism configured for triggering an activation lever of the blocking mechanism for activating the blocking mechanism, wherein the trigger mechanism comprises a drive axis rotated by the rope, the drive axis carrying a centrifugal weight holder, wherein at least one centrifugal weight is held acting against a restoring force of a spring and is movable between an inactive position and a trigger position for triggering the activation lever. The centrifugal weight holder is arranged rotatably relative to a release gear that comprises a toothing engagable by an actuator member of the at least one centrifugal weight, when the at least one centrifugal weight is in the trigger position.

18 Claims, 9 Drawing Sheets

(56) References Cited

U.S. PATENT DOCUMENTS

| | | | |
|---|---|---|---|
| 2005/0082115 | A1 | 4/2005 | Petzl et al. |
| 2011/0186385 | A1 | 8/2011 | Okada |

FOREIGN PATENT DOCUMENTS

| | | | |
|---|---|---|---|
| DE | 102011106636 | A1 | 1/2013 |
| EP | 3278840 | A1 | 2/2018 |
| EP | 3574958 | A1 | 12/2019 |
| WO | 2018115213 | A1 | 12/2018 |

OTHER PUBLICATIONS

Chinese Office Action dated Mar. 29, 2025 from Chinese Counterpart Application No. 202180045843.1.

* cited by examiner

FALL ARREST DEVICE

CROSS REFERENCES TO RELATED APPLICATIONS

This application is a continuation of international patent application PCT/EP2021/066286, filed on Jun. 16, 2021, designating the U.S.A., which international patent application has been published in English language and claims priority from European patent application 20185432.0, filed on Jul. 13, 2020. The entire contents of these priority applications are incorporated herein by reference.

BACKGROUND

The invention relates to a fall arrest device for blocking a rope when a relative speed between the rope and the device reaches a threshold value, the device comprising a blocking mechanism for blocking the rope, and a trigger mechanism configured for triggering an activation lever of said blocking mechanism for activating the blocking mechanism for blocking the rope when the speed reaches the threshold value, wherein the trigger mechanism comprises a drive axis rotated by the rope upon relative movement between the rope and the fall arrest device, the drive axis carrying a centrifugal weight holder, wherein the at least one centrifugal weight is held acting against a restoring force, the at least one centrifugal weight being movable between an inactive position and a trigger position for triggering the activation lever when the speed reaches the threshold value.

Such a fall arrest device has become known by public use, since such a fall arrest device has been sold in public by the applicant under the trade name Blocstop™.

The Blocstop™ uses a trigger mechanism including two centrifugal weights that are arranged eccentrically on a centrifugal weight holder, the outer portions of which engage an activation lever of the blocking mechanism when the speed of descent between the rope and the Blocstop reaches a threshold value. Then one of the outer portions of a centrifugal weight moves under the action of the centrifugal force to engage the activation lever after a certain angular travel. Depending on the position of the centrifugal weights with respect to the activation lever during triggering thereof, it may take a rotation of the centrifugal weights up to a large angle of rotation before the blocking mechanism is activated.

This is a somewhat undesirable situation, since preferably an activation of the blocking mechanism should not depend to a large extent on a particular position of the device when the blocking mechanism is activated. Thus, although the known device works for automatic stopping and holding of a suspended equipment, such as a suspended access equipment (SAE), suspended from ropes against a failure, such as resulting from a rupture of the working rope or from the breaking of the gear, etc., the known device is not fully reproducible. The time lag for activation of the device may vary depending on the particular position of the centrifugal weights during activation.

Similar fall arrest devices are known from US 2004/0020727 A1 and from US 2005/0082115 A1 which suffer from similar drawbacks.

From EP 3 278 840 A1 a fall protection device is known that is adapted to be connected to a safety belt. It includes a frame forming a containing space, a shaft lever provided on the frame, a retard member, and a rotary drum. The retard member is pivotally provided on the shaft lever, which is received in the containing space and has a friction surface.

The rotary drum is fitted around the retard member and has an outer surface and an inner surface. The outer surface can be wound by the safety belt, and the inner surface faces the friction surface. Centrifugal weights supported on a centrifugal weight holder trigger a friction braking, if a certain descending speed of the safety belt is reached.

EP 3 574 958 A1 discloses a device for automatic lowering of a rope after a fall arrest. The device comprises a ratchet wheel that cooperates with two ratchet elements that are arranged to swivel outwardly to engage the ratchet wheel upon reaching a certain threshold speed of descent of the rope for effecting a braking operation, Thereafter, the ratchet wheel may be disengaged to effect a braked lowering of the rope for a controlled descent.

DE 10 2011 106 636 A1 discloses an endless cable hoist comprising a working cable, a safety cable, and a driving cable pulley around at least a part of which the working cable is wrapped. A drive is provided for driving the driving cable pulley and a non-driven safety cable pulley, which is rotatably mounted in a housing and around which the safety cable is wrapped. An arresting device is provided including a ratchet wheel cooperating with a ratchet element that engages the ratchet wheel when the ratchet rotates with a certain threshold speed. Thereby a friction brake is activated which blocks and brakes the safety cable.

SUMMARY

In view of this it is a first aspect of the invention to disclose an improved fall arrest device for blocking a rope when a speed of descent between the rope and the device reaches a threshold value.

It is a further aspect of the invention to disclose an improved fall arrest device wherein the trigger mechanism leads to a fast triggering action when the speed of the rope reaches the threshold value.

It is a further aspect of the invention to disclose an improved fall arrest device wherein the action of the trigger mechanism is largely independent from the position of the device during activation.

It is a further aspect of the invention to disclose an improved fall arrest device which is highly reliable.

These and other aspects are achieved with a fall rest device according to claim 1.

Thereby the object of the invention is fully achieved.

By using a release gear that comprises a toothing engagable by the actuator member of the at least one centrifugal weight the activation of the blocking mechanism becomes independent to a large extent from the angular position of the centrifugal weights at the time of activation of the blocking mechanism.

According to a further development of the invention the activation lever is arranged pivotably about an axis arranged at a distance outside from the release gear.

According to a further development of the invention the activation lever comprises a first end cooperating with an outer toothing of the release gear, wherein the activation lever preferably engages the outer toothing with the first end, when the activation lever is in an open position corresponding to the inactive position of the trigger mechanism.

According to a further development of the invention the activation lever comprises a second end comprising a catch section engaging a catch roll when being in the open position, the catch roll upon triggering of the trigger mechanism being moved by the outer toothing from the open position into a closed position, thereby activating the blocking mechanism by releasing the catch roll.

According to a further development of the invention the catch section of the second end of the activation lever is configured as a claw engaging a recess of the catch roll when being in the open position, the claw being released form the recess of the catch roll upon triggering of said trigger mechanism.

According to a further development of the invention the at least one centrifugal weight is arranged pivotably about a swivel axis located on the centrifugal weight holder acting against the restoring force of a spring, wherein the at least one centrifugal weight upon rotation of the drive axis is movable from the inactive position to the trigger position for triggering the activation lever when the restoring force of the spring is overcome upon reaching the threshold value.

According to a further development of the invention each centrifugal weight carries one actuator member cooperating with an inner toothing of the release gear, so that the toothing is rotated by the actuator member upon reaching the threshold value.

All these features facilitate a simple and reliable design.

According to a preferred development of the invention the toothing comprises a plurality of teeth including at least eight teeth, preferably at least sixteen teeth, more preferably twenty four teeth.

Using a larger number of teeth leads to a shorter triggering of the blocking mechanism independently from the angular position of the at least one centrifugal weight.

According to another development of the invention there are provided two centrifugal weights that are held eccentrically on the centrifugal weight holder acting against a restoring force of a spring.

This leads to an easy construction and to a balanced behavior.

According to another development of the invention each of the centrifugal weights is arranged pivotably about a swivel axis arranged eccentrically on the centrifugal weight holder.

This allows for a simple construction.

According to another development of the invention each centrifugal weight carries a pin engaging a slot provided within a bracket extending across the centrifugal weights.

This feature facilitates an even triggering, independently on which centrifugal weight moves outwardly first.

According to another development of the invention each centrifugal weight comprises an actuator member configured as an actuator pin that is arranged for engaging an inner toothing of the release gear when the at least one centrifugal weight is in the trigger position.

This allows for an easy transfer of the rotational motion from the weight holder onto the release gear.

According to another development of the invention the release gear comprises an outer toothing that engages the activation lever for rotating the activation lever into a position for activating the blocking mechanism when the at least one centrifugal weight is in the trigger position.

According to a further development of the invention each of the centrifugal weights has a substantially semi-cylindrical shape being supported at one end pivotably about the swivel axis against the restoring force of the spring which biases the centrifugal weights against each other.

These features facilitate an easy and reliable construction.

According to another development of the invention the release gear is combined with a bearing disk which is mounted rotatably on the drive axis. It may be secured to the bearing disk or it may be integral therewith.

Also this features facilitates an easy and reliable design.

It will be understood that the aforementioned features and the features to be mentioned hereinafter cannot only be used in the respectively given combination but also in different combinations or independently. Further features and advantages of the invention will become apparent from the following description with reference to the drawings.

EMBODIMENTS

Figure 1:
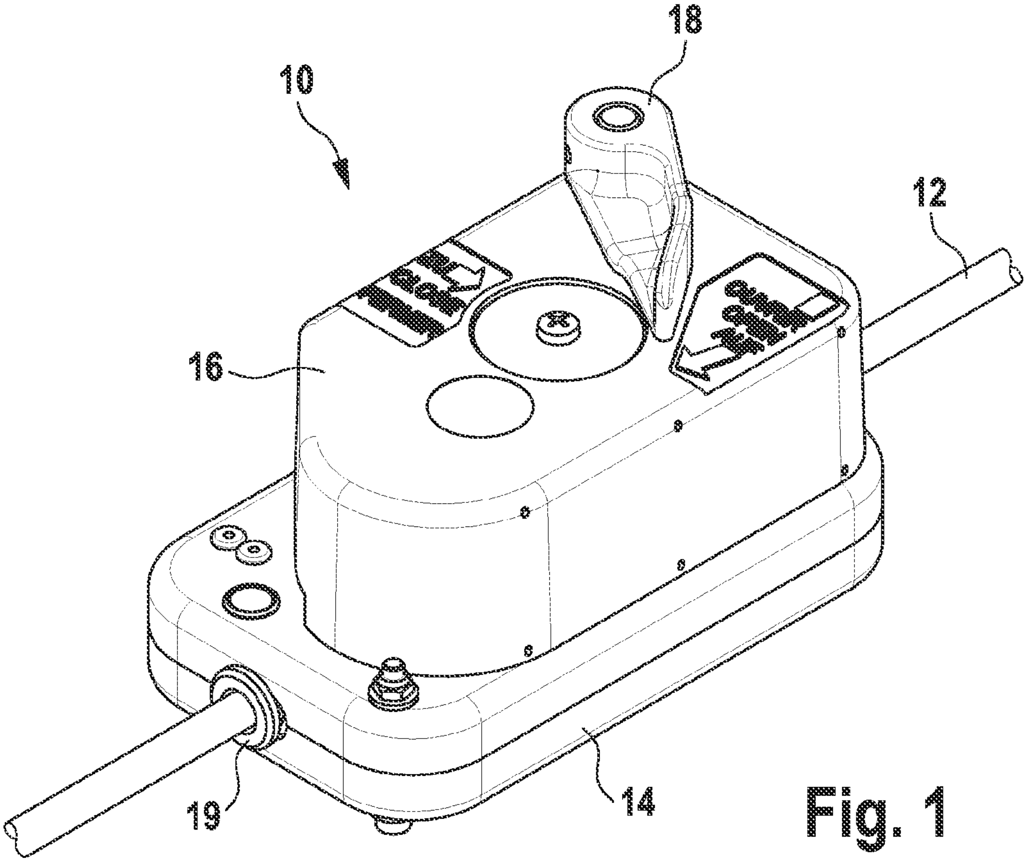
FIG. 1 a perspective view of the fall arrest device according to the invention.

In FIG. 1 a fall arrest device according to the invention is shown in perspective view and designated in total with reference numeral 10.

The fall arrest device 10 is provided as a safety measure for effecting automatic stopping and holding of a suspended equipment, such as a suspended access equipment (SAE) suspended from ropes. The fall arrest device 10 according to FIG. 1 only blocks the rope 12, if the rope 12 ascends at a certain threshold speed relative to the fall arrest device 10, or vice versa, if the fall arrest device 10 descends at least with the threshold speed with respect to the rope 12.

In FIG. 1 a rope 12 is shown which is guided through the fall arrest device 10. At the lower side of the fall arrest device 10 a sleeve 19 can be seen from which the rope 12 emerges.

The fall arrest device 10 comprises a housing 14 and a top cover 16 whereon a handle 18 can be seen. The handle 18 can be switched manually between a blocking position and an open position as indicated on the top cover 16. However, such a manual switching is only possible when the fall arrest device 10 is not under load.

Figure 2:
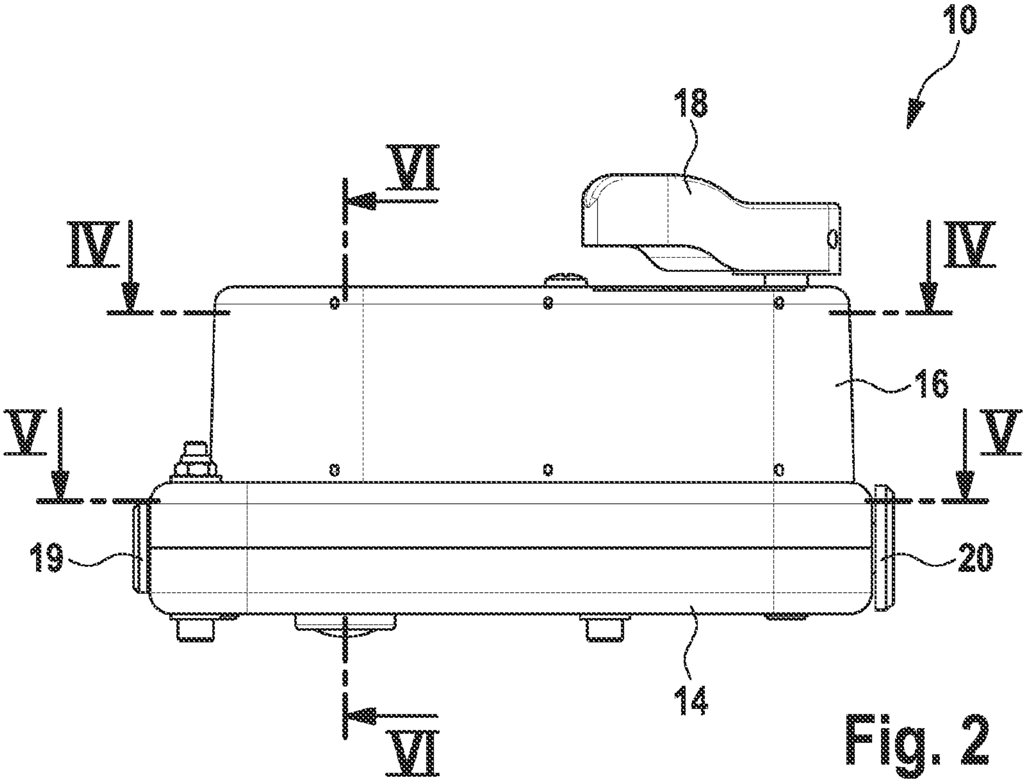
FIG. 2 a side view of the fall arrest according to claim 1.

The fall arrest device 10 is shown in FIG. 2 in a side view. The same features as in FIG. 1 can be seen. Only in addition on the right end of the fall arrest device 10 a further sleeve 20 can be seen through which the rope 12 (not shown) enters into the device 10 and leaves it through the other sleeve 19 on the left (or during application the lower) side.

Figure 5:
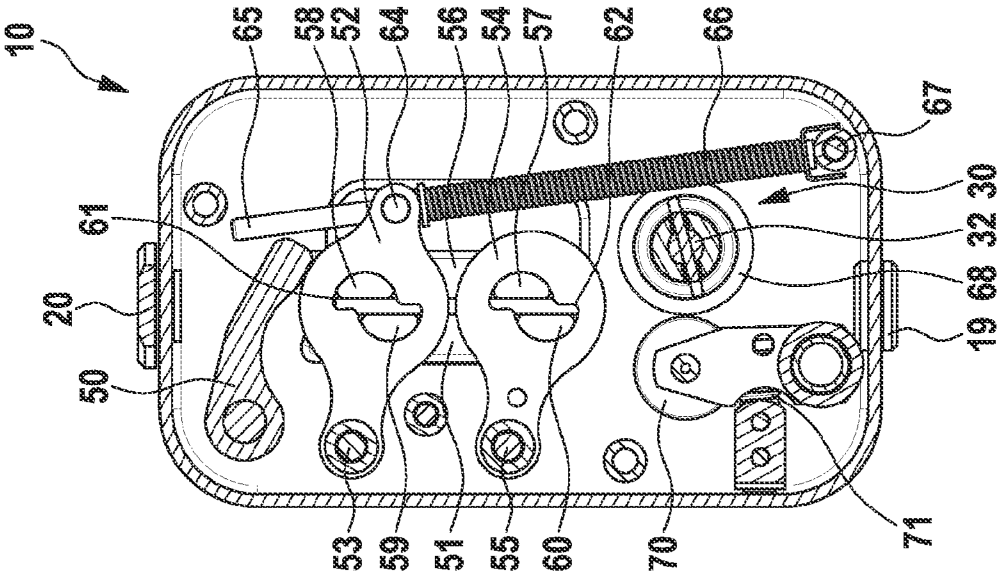
FIG. 5 a cross sectional view of the fall arrest device according to FIG. 2 along the line V-V, shown in the open position.
Figure 4:
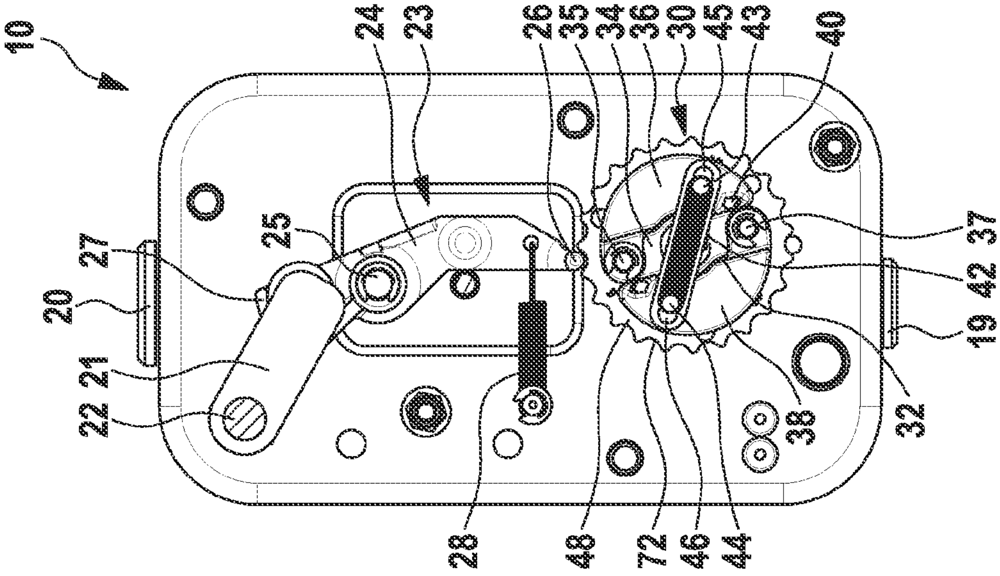
FIG. 4 a cross sectional view of the fall arrest device according to FIG. 2 shown along the line IV-IV in the open position.

The fall arrest device 10 according to the invention comprises a blocking mechanism which can be seen in FIGS. 4 and 5 and which is designated in total with reference numeral 23. The blocking mechanism 23 which can be seen in FIG. 4 is substantially identical to the blocking mechanism Blocstop™ which has become known by public use.

The blocking mechanism 23 cooperates with a trigger mechanism 30 which forms the novel and inventive part of the fall arrest device 10.

Figure 6:
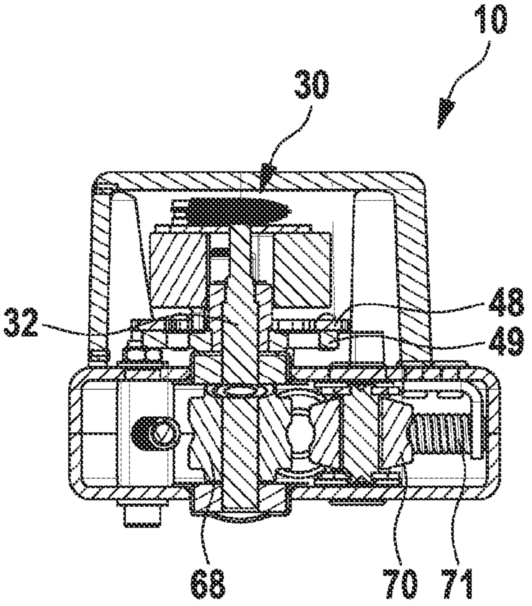
FIG. 6 the fall arrest device according to FIG. 2, shown in the cross sectional view along the line VI-VI.
Figure 7:
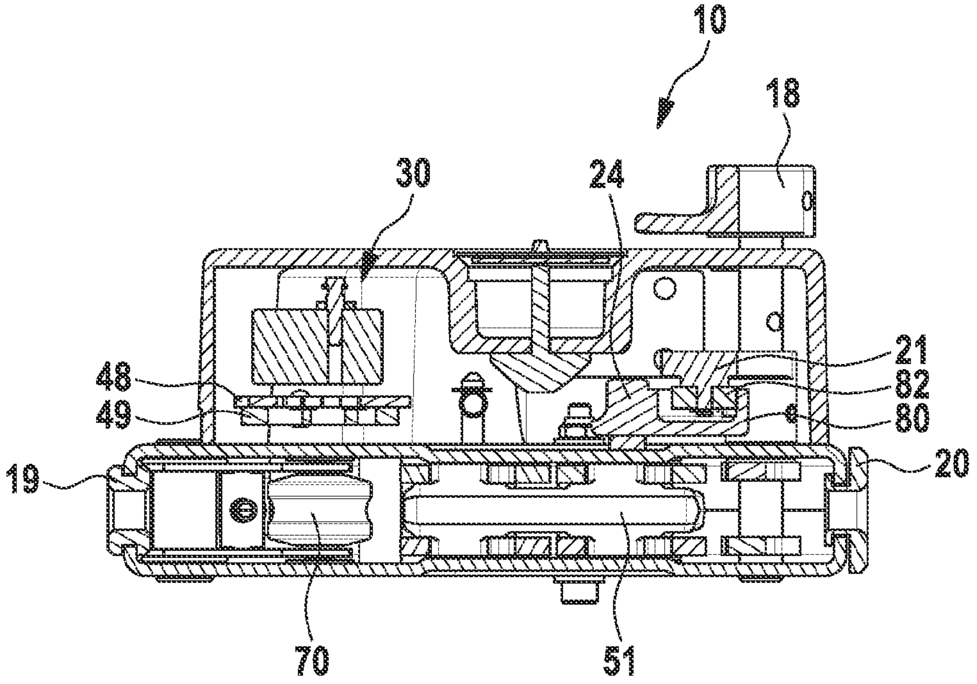
FIG. 7 a cross sectional view of the fall arrest device according to FIG. 3, shown along the line VII-VII.

The trigger mechanism 30 comprises a drive axis 32 which can be seen in FIGS. 4 and 5, but particularly well in FIG. 6. The drive axis 32 carries a drive roll 68 (see FIG. 6) cooperating with a pressure roll 70 that is pressed from the outside by a pressure spring 71 against the rope 12 (not shown) extending between the two sleeves 19, 20 (see FIG. 7). Thus any movement of the rope 12 relative to the fall arrest device 10 leads to a rotation of the drive axis 32.

Figure 4A:
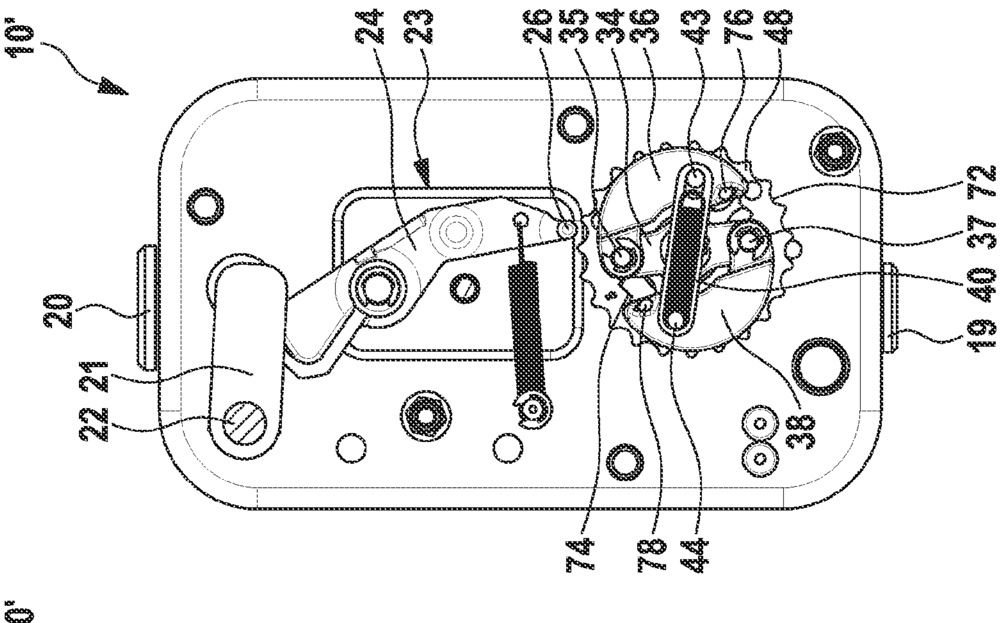
FIG. 4*a* the cross sectional view according to FIG. 4, but shown in the closed position.
Figure 10:
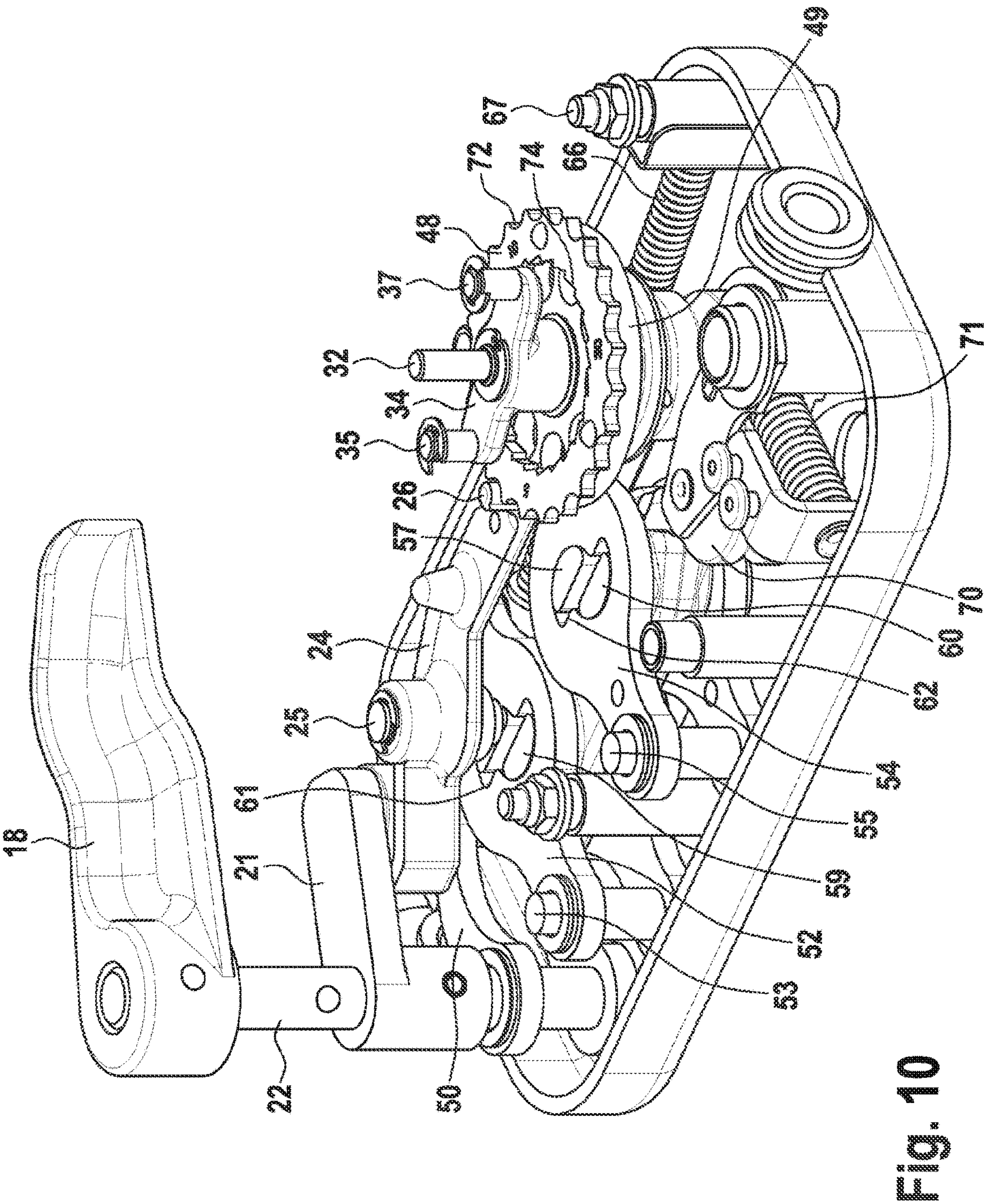
FIG. 10 the fall arrest device according to FIG. 8 after removal of the centrifugal weights from the centrifugal weight holder and also after removal of the upper part of the housing, shown in the open position.

On the drive axis 32 at an upper section thereof, there is held a bearing disk 49 which is freely rotatable relative to the drive axis 32 (see FIG. 6). On top of the bearing disk 49 there is rigidly secured a release gear 48 (see FIGS. 6 and 4). The release gear 48 has an outer toothing 72 including twenty four teeth. In the position shown in FIG. 4 the outer toothing engages a first end 26 of the activation lever 24 of the blocking mechanism 23. The activation lever 24 is mounted pivotably about an axis 25 (see FIGS. 4, 8 and 10). Depending on the position of the activation lever 24 the first end 26 thereof may either engage the outer toothing 72 of the release gear 48 (as shown in FIG. 4), or it may be out of engagement, such as shown in FIG. 4*a*. If the first end 26 of the activation lever 24 engages the outer toothing 72, (such as shown in FIG. 4), this is the open position of the blocking mechanism 23 in which the rope 12 can freely run through the fall arrest device 10 without any blocking or braking action.

Figure 3:
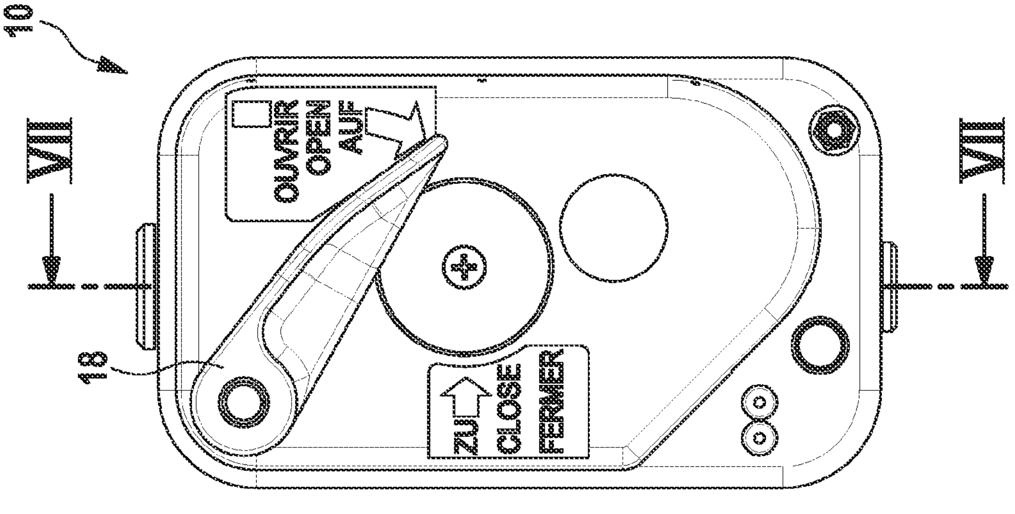
FIG. 3 a top view of the fall arrest device according to FIG. 1, shown in the open position.
Figure 8:
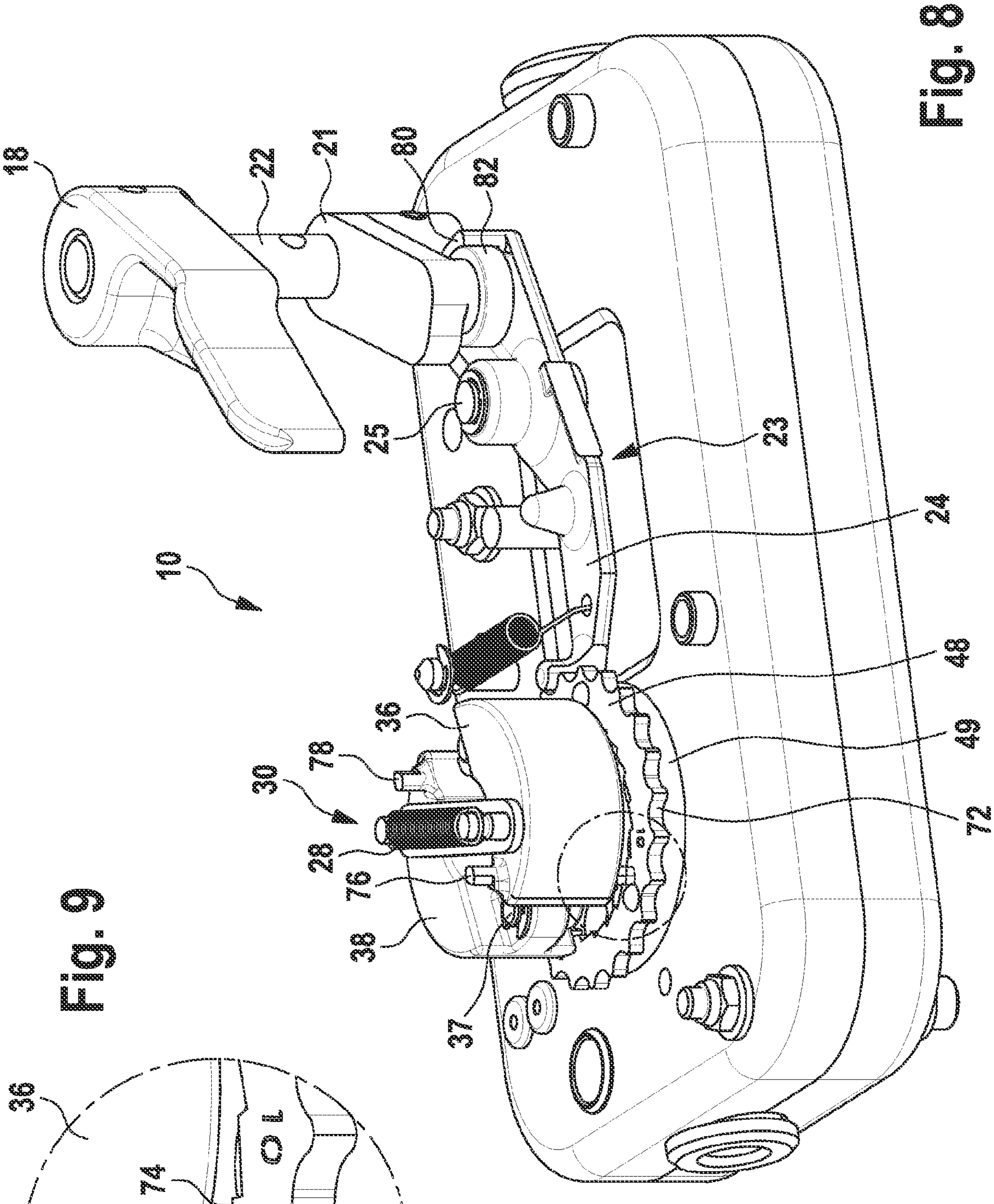
FIG. 8 the fall arrest device according to FIG. 1 after removal of the top cover, shown in the open position.
Figure 9:
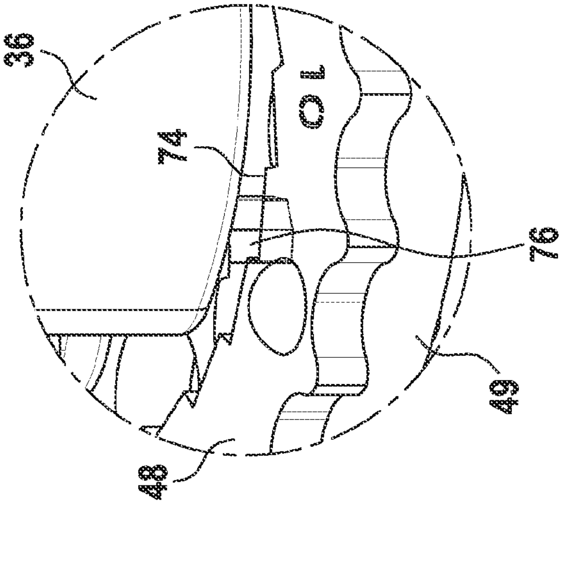
FIG. 9 an enlarged representation of the encircled part according to FIG. 8.

The second end of the activation lever 24 opposite to the first end 26 carries a curved catch section 80 that cooperates with a catch roll 82 (see FIG. 8). The catch roll 82 is held at a lower end of a lever 21 that is supported on an axis 22 at the upper end of which the handle 18 is secured. The handle 18 allows to move the fall arrest device 10 manually into the open position as shown in FIG. 3 which is possible only, if the fall arrest device 10 is not under load. The open position of the fall arrest device throughout the drawings is indicated by 10, while the closed position in which the blocking or braking action occurs is indicated by 10'.

A spring 28 engaging the activation lever 24 at the side of the first end 26 pulls the activation lever 24 into the open position, wherein the first end 26 engages the outer toothing 72 of the release gear 48.

The trigger mechanism 30 comprises two centrifugal weights 36, 38 that are held on a centrifugal weight holder 34 which is rigidly secured to the drive axis 32. The centrifugal weights 36, 38 have a substantially semi-cylindrical shape and are attached eccentrically at one end thereof pivotably about a swivel axis 35, 37 (see FIG. 4). The centrifugal weights 36, 38 can swivel to the outside under action of the centrifugal force during rotation. Each centrifugal weight 36, 38 comprises a pin 43, 44 extending within a slot 45, 46 of a compensation bracket 42 extending across the two centrifugal weights 36, 38. The compensation bracket is centered with respect to the drive axis 32.

Between the two pins 43, 44 there is secured a tension spring 40. So in case of rotation of the drive axis 32 the centrifugal weights 36, 38 are urged to the outside, however cannot move as long as the centrifugal force does not overcome the bias force of the tension spring 40. If the relative speed between the rope 12 and the device 10 reaches the threshold value, the two centrifugal weights 36, 38 will overcome the bias force of the tension spring 40 and will move to the outside so that the pins 43, 44 will move within the respective slots 45, 46 of the compensation bracket 42.

In particular from FIGS. 8, 9, 11, 11*a* it can be seen that the release gear 48 also comprises an inner toothing 74, carrying twenty four teeth. The centrifugal weights 36, 38 each carry an actuator pin 76, 78 (see in particular FIGS. 8 and 9) arranged close to an end opposite to the swivel axis 35, 37 thereof. The actuator pin 76, 78 cooperates with the inner toothing 74 of the release gear 48. When the relative speed between the rope 12 and the device 10 reaches the threshold value so that the restoring force of the tension spring 40 is overcome, the centrifugal weights 36, 38 swivel to the outside, whereby the actuator pins 76, 78 engage the inner toothing 74.

It is noted that the inner toothing 74 is designed with a slanted tooting configured so that an engagement with the actuator pins 76, 78 occurs only when the rope 12 moves upwardly with respect to the fall arrest device 10 or when the fall arrest device 10 moves downwardly with respect to the rope 12.

So when the trigger mechanism 30 is activated, the actuator pins 76, 78 engage with the inner toothing 74, whereby the release gear 48 is moved in the release direction which is this case is in the clockwise direction thus activating the blocking mechanism 23 by moving the activation lever 24 against the action of the spring 28 from the engaged position with the outer toothing 72 shown in FIG. 4 into the closed position which in this case is to the right. Thereby the blocking mechanism 23 is moved into the closed position shown in FIGS. 4*a*, 5*a*, wherein the device is denoted with 10'.

Figure 5A:
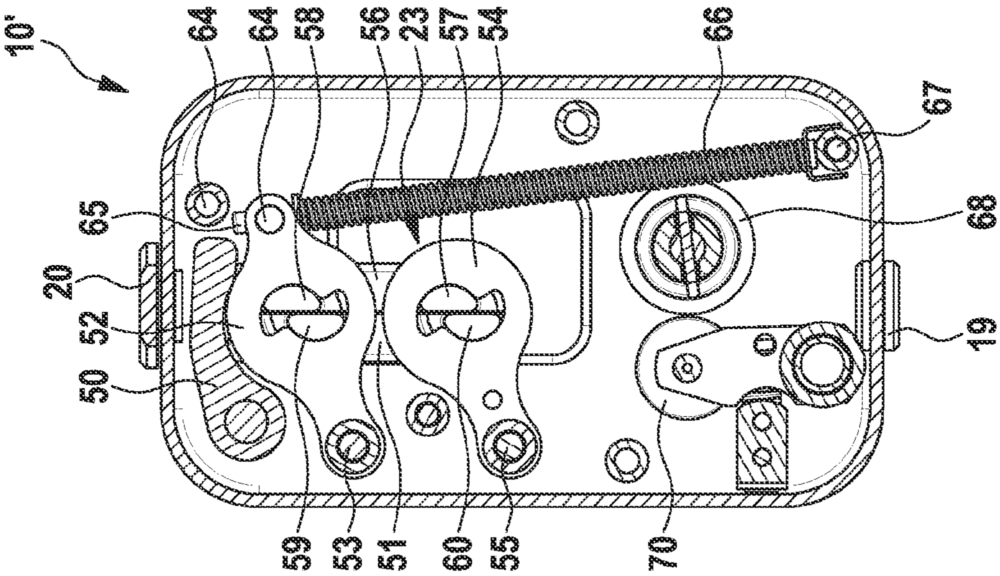
FIG. 5*a* the fall arrest device according to FIG. 5, but shown in the closed position.
Figure 3A:
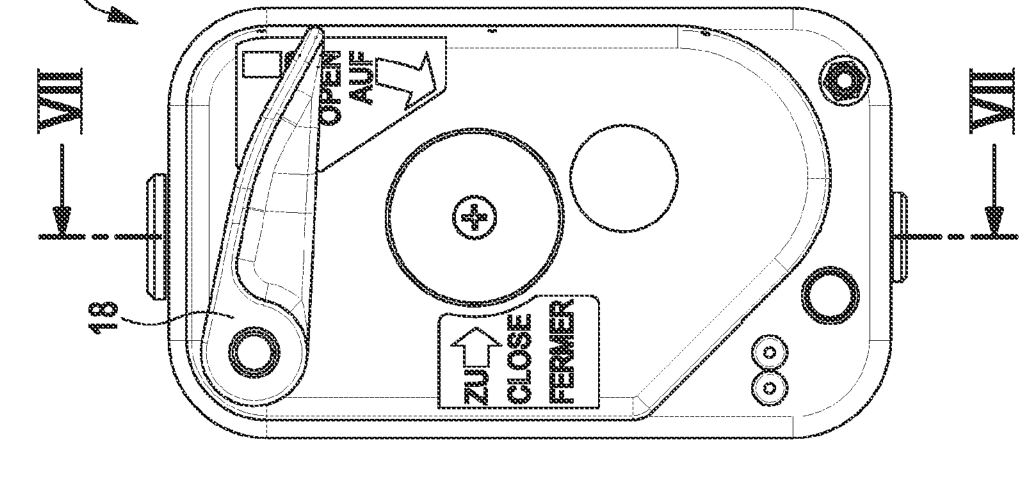
FIG. 3*a* the fall arrest device according to FIG. 3, shown in the activated position.
Figure 11:
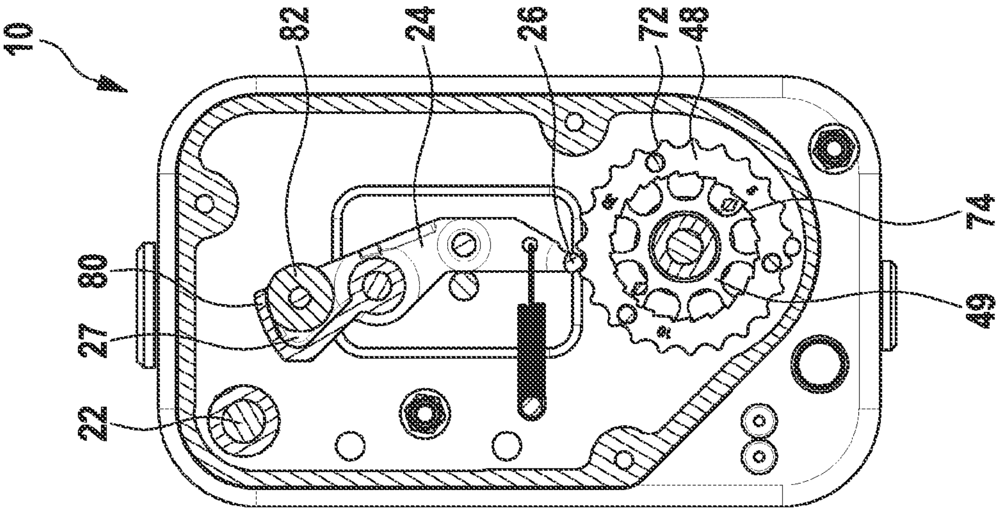
FIG. 11 a cross sectional view of the fall arrest device cut through a plane just above the release gear, shown in the open position.
Figure 11A:
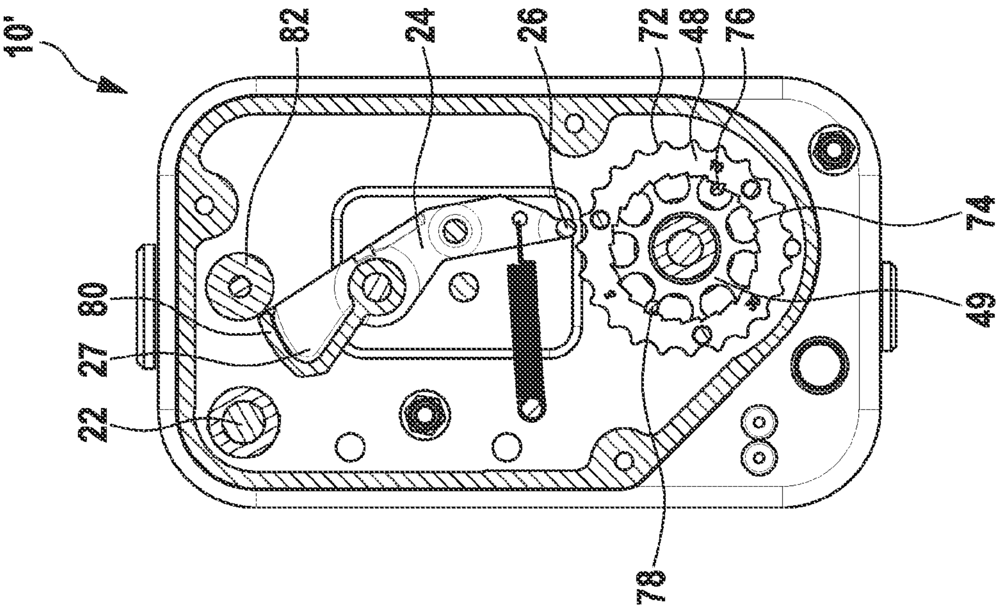
FIG. 11*a* a cross sectional view of the fall arrest device according to FIG. 11, but shown in the closed position.

As can be seen in FIG. 11*a* and also in FIGS. 3*a*, 4*a* and 5*a* the lever 21 is moved thereby, freeing the catch roll 82 from the catch section 80 of the activation lever 24. The blocking mechanism 23 comprises two brake lever pairs 52, 54 which can be seen in FIGS. 4, 5, 4*a* and 5*a* and also in FIG. 10. The brake lever pairs 52, 54 cooperate with brake pads 51, 56. For moving the brake pads (one 51 of which can be seen in FIG. 7) the brake levers are arranged in brake lever pairs 52, 54, one at the upper side of the brake pads 51, 56, and one at the lower side of the brake pads 51, 56. The brake lever pairs 52, 54 are each held pivotably about a pivot axis 53, 55 at one end thereof. The end opposite the pivot axis 53 of the first brake lever pair 52 is fixed to a spring carrier using a control pin. The spring carrier 65 at one end is attached pivotably to a pivot axis 67 and carries a pressure spring 66 which urges the first brake lever pair 52 into the direction of the closed position which is shown in FIGS. 4*a* and 5*a*. Upon release of the catch roll 82 by the catch section 80, when the activation lever 24 is moved into the closed position as shown in FIGS. 4*a* and 5*a*, the first brake lever pair 52 is moved under the action of the pressure spring 66 into the closed position shown in FIG. 5*a* and denoted with reference numeral 10'.

A blocking or braking action is effected thereby, since brake pads 51, 56, which can be seen in FIGS. 5 and 5*a*, are moved towards each other, since control cams 57, 60 of the second brake lever pair 54 and 58, 59 of the first brake lever pair 52 are moved within associated control slots 62, and 61, respectively. If one brake lever pair 52 is moved then also the other brake lever pair 54 is moved simultaneously, since the movement of the control cams 58, 59 within the control slot 61 also leads to a movement of the control cams 57, 60 within the control slot 62. By this action the brake pads 51, 55 are moved against the rope 12 extending between the sleeves 19, 20 (the rope 12 being shown only in FIG. 1).

Thus under the action of the pressure spring 66 that is held on the spring carrier 65 and that engages the first brake lever pair 52 the first brake lever pair 52 is moved into the closed or braking position. Thereby, also control lever 50 that is fixed to axis 22 (see FIGS. 5, 5*a*, and 10) is moved upwardly.

The control lever 50 that is attached to the axis 22, whereon the handle 18 is attached, can be used to move the fall arrest device 10 manually between the closed position shown in FIGS. 3*a*, 4*a* and 5*a* and the open position shown in FIGS. 3, 4 and 5 when the fall arrest device 10 is not under load.

For use as a safety device in the beginning the handle 18 of the fall arrest device 10 is moved into the open position shown in FIGS. 3, 4 and 5. Thus the first end 26 of the activation lever 24 is moved into engagement with the outer toothing 72 of the release gear 48. Also the catch roll 82 carried by lever 21 is moved into the position shown in FIG. 8.

Starting from this position the trigger mechanism 30 will be activated, when the relative speed between the rope 12 and the device 10 reaches the threshold value to overcome the restoring force of the tension spring 40.

Thereby the actuator pins 76, 78 will engage the inner toothing 74 of the release gear 48 and rotate the release gear 48. Thus the outer toothing 72 of the release gear 48 will move the activation lever 24 from the open position into the activated or closed position (see FIGS. 11 and 11*a*). Thus the blocking mechanism 23 is moved into the blocking or braking position, whereby the rope 12 is blocked.

Figure 12:
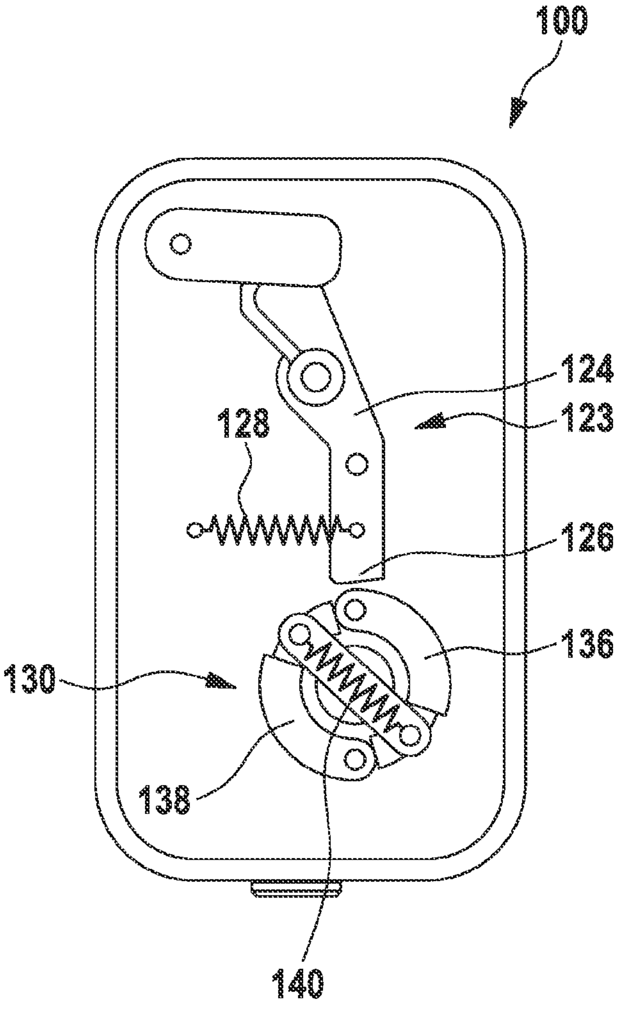
FIG. 12 a top view of the prior art fall arrest device Blocstop™ shown in a similar representation as the inventive device according to FIG. 11*a*.

For comparison in FIG. 12 the prior art fall arrest device Blocstop™ is shown in a similar representation as the inventive device according to FIG. 11*a*.

The prior art fall arrest device 100 also comprises a blocking mechanism 123 including an activation lever 124 cooperating with a trigger mechanism 130 comprising two substantially semi-circular centrifugal weights 136, 138 that are supported on a centrifugal weight holder that is driven by a drive axis, if there is a relative speed between the rope and the fall arrest device 100. The activation lever 124 is pulled by a spring into the open position. The two centrifugal weights 136, 138 are biased against each other by a spring 140. If the relative speed between the rope and the fall arrest device 100 reaches the threshold value, the force of the spring 140 is overcome so that the centrifugal weights 136, 138 swivel outwardly, until one of the centrifugal weights 136, 138 will engage the first end of the activation lever 126. Thereby the blocking mechanism 123 is activated for blocking the rope.

Figure 13:
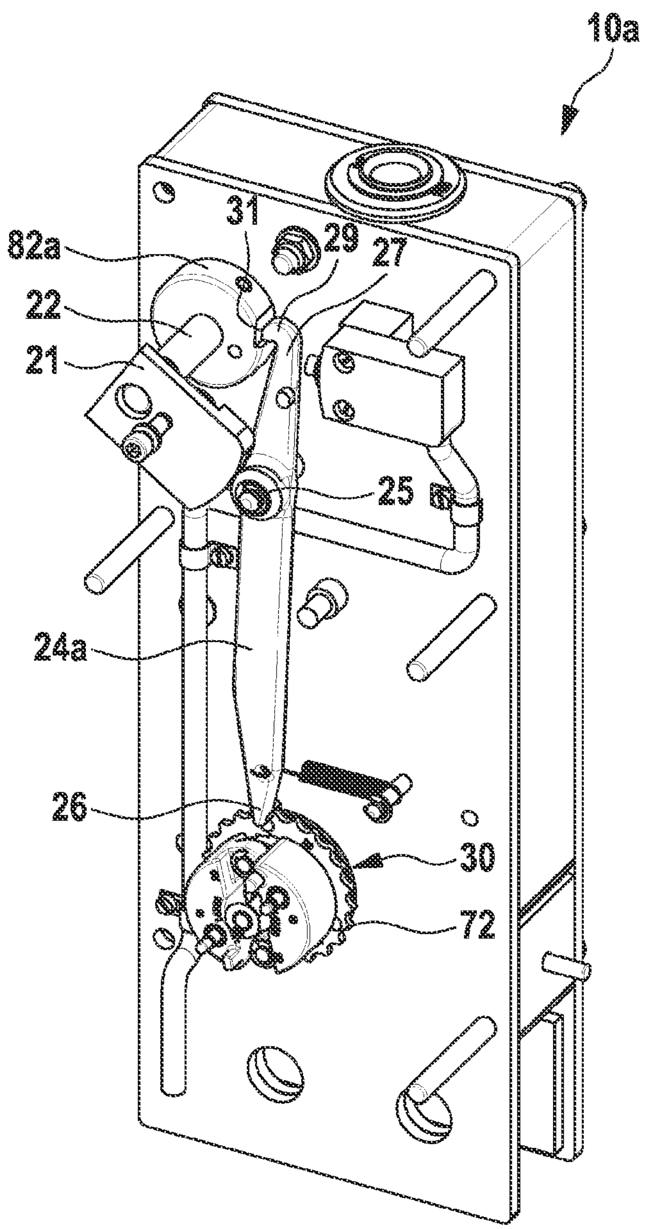
FIG. 13 a perspective representation of an alternative embodiment showing a slightly different design the FIG. 8.

In FIG. 13 an alternative design of the fall arrest device is shown in perspective view similar to the embodiment that can be seen in FIG. 8 and designated in total with 10*a*. The catch roll is designated with 82*a*, and the activation lever is designated with 24*a*. Apart from that the same reference numerals are used for similar parts explained before with respect to FIGS. 1 to 11.

The fall arrest device 10*a* according to FIG. 13 differs from the embodiment explained before in that the second end 27 of the activation lever 24*a* carries a claw 29 that engages a latching recess 31 provided on the catch roll 82*a* when being in the open position shown in FIG. 13. When the trigger mechanism 30 is activated when the centrifugal weights 36, 38 overcome the restoring force of the spring 28, the outer toothing 72 is moved counter clockwise against the action of the spring shown in FIG. 13, thereby moving the trigger mechanism 30 into the closed position (the movement is into the opposite direction as explained before with respect to FIGS. 1 to 11 of the first embodiment; the other parts are rearranged accordingly to reach the same function). Thus the second end 27 of the activation lever 24*a* is moved to the right, thereby freeing the catch roll 82*a* and activating the blocking mechanism 23.

The invention claimed is:

1. A fall arrest device for blocking a rope when a relative speed between the rope and the device reaches a threshold value, the device comprising:

a rope blocker for blocking the rope, said rope blocker including an activation lever;

a trigger configured for triggering said activation lever of said rope blocker for activating said rope blocker for blocking said rope when said relative speed reaches said threshold value, wherein said trigger comprises a drive axis configured for being rotated by said rope upon relative movement between said rope and said fall arrest device, said drive axis carrying a centrifugal weight holder rigidly secured to said drive axis; and a release gear supported on said drive axis freely rotatable thereto, said release gear comprising an outer toothing and an inner toothing;

wherein on said centrifugal weight holder there are held two centrifugal weights acting against a restoring force, each centrifugal weight comprising an actuator-pin, said two centrifugal weights being movable between an inactive position and a trigger position for triggering said activation lever when said speed reaches said threshold value;

wherein said centrifugal weight holder is arranged rotatably relative to said release gear, said outer toothing of said release gear being engagable by said actuator pin of said two centrifugal weights, when said two centrifugal weights are in said trigger position for triggering said activation lever for blocking said rope;

wherein said two centrifugal weights are arranged pivotably about swivel axes each of which is located on said centrifugal weight holder, a spring being arranged between said two centrifugal weights exerting said restoring force for biasing said two centrifugal weights against each other, and wherein said two centrifugal weights upon rotation of said drive axis are movable from said inactive position to said trigger position for triggering said activation lever when said restoring force of said spring is overcome by a centrifugal force exerted on said two centrifugal weights upon reaching said threshold value;

wherein each centrifugal weight comprises the actuator pin being arranged for engaging said inner toothing of said release gear when said at least one centrifugal weight is in said trigger position.

2. A fall arrest device for blocking a rope when a relative speed between the rope and the device reaches a threshold value, the device comprising:

a rope blocker for blocking the rope, said rope blocker including an activation lever;

a trigger configured for triggering said activation lever of said rope blocker for activating said rope blocker for blocking said rope when said relative speed reaches said threshold value, wherein said trigger comprises a drive axis configured for being rotated by said rope upon relative movement between said rope and said fall arrest device, said drive axis carrying a centrifugal weight holder rigidly secured to said drive axis; and a release gear supported on said drive axis freely rotatable thereto, said release gear comprising an outer toothing and an inner toothing;

wherein on said centrifugal weight holder there are held two centrifugal weights acting against a restoring force, each centrifugal weight comprising an actuator, said two centrifugal weights being movable between an inactive position and a trigger position for triggering said activation lever when said speed reaches said threshold value;

wherein said centrifugal weight holder is arranged rotatably relative to said release gear, said outer toothing of said release gear being engagable by said actuator of said two centrifugal weights, when said two centrifugal weights are in said trigger position for triggering said activation lever for blocking said rope;

wherein said two centrifugal weights are arranged pivotably about swivel axes each of which is located on said centrifugal weight holder, a spring being arranged between said two centrifugal weights exerting said restoring force for biasing said two centrifugal weights against each other, and wherein said two centrifugal weights upon rotation of said drive axis are movable from said inactive position to said trigger position for triggering said activation lever when said restoring force of said spring is overcome by a centrifugal force exerted on said two centrifugal weights upon reaching said threshold value.

3. The fall arrest device of claim 2, wherein said activation lever is arranged pivotably about an axis arranged at a distance outside from said release gear.

4. The fall arrest device of claim 2, wherein said activation lever comprises a first end cooperating with said outer toothing of said release gear, wherein said activation lever engages said outer toothing with said first end when said activation lever is in an open position corresponding to said inactive position of said trigger.

5. The fall arrest device of claim 4, wherein said activation lever comprises a second end comprising a catch section engaging a catch roll when being in said open position, said catch roll upon triggering of said trigger being moved by said outer toothing from said open position into a closed position, thereby activating said rope blocker by releasing said catch roll.

6. The fall arrest device of claim 5, wherein said catch section of said second end of said activation lever is configured as a claw engaging a recess of said catch roll when being in said open position, said claw being released from said recess of said catch roll upon triggering of said trigger, thereby activating said rope blocker.

7. The fall arrest device of claim 2, wherein each centrifugal weight comprises the actuator cooperating with said inner toothing of said release gear for rotating said outer and said inner toothings by means of said actuator upon reaching said threshold value.

8. The fall arrest device of claim 2, wherein said two centrifugal weights are held eccentrically on said centrifugal weight holder acting against said restoring force of said spring.

9. The fall arrest device of claim 8, wherein each of said centrifugal weights is arranged pivotably about the swivel axis arranged eccentrically on said centrifugal weight holder.

10. The fall arrest device of claim 2, wherein each of said centrifugal weights has a substantially semi-cylindrical shape being supported at one end pivotably about said swivel axis against said restoring force of said spring which biases said centrifugal weights against each other.

11. A fall arrest device for blocking a rope when a relative speed between the rope and the device reaches a threshold value, the device comprising:

a rope blocker for blocking the rope, said rope blocker including an activation lever;

a trigger configured for triggering said activation lever of said rope blocker for activating said rope blocker for blocking said rope when said relative speed reaches said threshold value, wherein said trigger comprises a drive axis configured for being rotated by said rope upon relative movement between said rope and said fall arrest device, said drive axis carrying a centrifugal weight holder rigidly secured to said drive axis; and a release gear supported on said drive axis freely rotatable thereto, said release gear comprising an outer toothing and an inner toothing;

wherein on said centrifugal weight holder there is held at least one centrifugal weight acting against a restoring force, each centrifugal weight comprising an actuator, said at least one centrifugal weight being movable between an inactive position and a trigger position for triggering said activation lever when said speed reaches said threshold value;

wherein said centrifugal weight holder is arranged rotatably relative to said release gear, said outer toothing of said release gear being engagable by said actuator of said at least one centrifugal weight, when said at least one centrifugal weight is in said trigger position for triggering said activation lever for blocking said rope.

12. The fall arrest device of claim 11, wherein said outer toothing comprises a plurality of teeth including at least eight teeth.

13. The fall arrest device of claim 11, wherein each centrifugal weight carries a pin engaging a slot provided within a bracket extending across said centrifugal weights.

14. The fall arrest device of claim 11, wherein each centrifugal weight comprises the actuator configured as an actuator pin being arranged for engaging said inner toothing of said release gear when said at least one centrifugal weight is in said trigger position.

15. The fall arrest device of claim 14, wherein said inner toothing of said release gear is configured for engaging said actuator pin only, if said rope ascents with respect to said device or said device descents with respect to said rope.

16. The fall arrest device of claim 11, wherein said outer toothing of said release gear, when being in said trigger position, engages said activation lever for rotating said activation lever into a position for activating said rope blocker.

17. The fall arrest device of claim 11, wherein said drive axis comprises a bearing disk being mounted rotatably thereon.

18. The fall arrest device of claim 17, wherein said bearing disk is rigidly secured to said release gear.

* * * * *